US009848232B2

(12) United States Patent
Patel et al.

(10) Patent No.: US 9,848,232 B2
(45) Date of Patent: Dec. 19, 2017

(54) ACQUIRING NETWORK CONFIGURATION DATA FOR A TELEVISION RECEIVER

(71) Applicant: EchoStar Technologies, L.L.C., Englewood, CO (US)

(72) Inventors: Bhavesh Patel, Woodstock, GA (US); Alan T. Pattison, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 367 days.

(21) Appl. No.: 14/166,022

(22) Filed: Jan. 28, 2014

(65) Prior Publication Data
US 2015/0215670 A1 Jul. 30, 2015

(51) Int. Cl.
*G06F 3/00* (2006.01)
*H04N 21/438* (2011.01)
*H04N 21/61* (2011.01)
*H04N 21/434* (2011.01)
*H04N 21/45* (2011.01)
*H04N 21/6547* (2011.01)

(52) U.S. Cl.
CPC ....... *H04N 21/438* (2013.01); *H04N 21/4345* (2013.01); *H04N 21/4508* (2013.01); *H04N 21/4516* (2013.01); *H04N 21/6143* (2013.01); *H04N 21/6547* (2013.01)

(58) Field of Classification Search
CPC .............. H04N 21/00; H04N 21/4424; H04N 21/4312; H04N 21/433; H04N 21/472; H04N 21/8153

USPC .......................................................... 725/41
See application file for complete search history.

(56) References Cited

U.S. PATENT DOCUMENTS

| 7,111,315 B1* | 9/2006 | Tsurumoto | H04H 20/59 348/E5.101 |
|---|---|---|---|
| 2005/0273822 A1* | 12/2005 | Snell | H04N 7/17336 725/64 |
| 2009/0183206 A1* | 7/2009 | Lee | H04N 5/50 725/56 |
| 2010/0115544 A1* | 5/2010 | Swenson | H04N 7/165 725/28 |
| 2015/0181307 A1* | 6/2015 | O'Callaghan | H04N 21/64776 725/51 |

* cited by examiner

*Primary Examiner* — Nathan Flynn
*Assistant Examiner* — Alfonso Castro
(74) *Attorney, Agent, or Firm* — Kilpatrick Townsend & Stockton LLP

(57) ABSTRACT

Various arrangements for acquiring network configuration data are presented. In response to a television receiver being booted, the television receiver may determine if it can communicate with a service provider's server. If so, the television receiver may request network configuration data from the television programming broadcast network configuration server via a network interface. The television receiver may receive the network configuration data from the television programming broadcast network configuration server via the network interface. Based on the network configuration data, the television receiver may process television programming data received via the tuner.

15 Claims, 7 Drawing Sheets

ACQUIRING NETWORK CONFIGURATION DATA FOR A TELEVISION RECEIVER

BACKGROUND

Initializing a television receiver, such as when it is first installed at a location and/or has been without power (e.g., unplugged) may result in a user having to wait a period of time before being able to watch television channels or otherwise view content via the television receiver. In some systems, such as satellite-based television service provider systems, a television receiver may be required to wait to view content until configuration data is received and used to properly configure the television receiver. This configuration data may be periodically transmitted via satellite, such as every five minutes. Therefore, the television receiver may need to be powered on for at least five minutes before all of the configuration data necessary for the television receiver to function properly is received by the television receiver. Such an arrangement may be frustrating for a user eager to interact with the television receiver and/or may result in economic and/or time inefficiencies if a service technician or other agent of the television service provider needs to wait for the television receiver to acquire the configuration data before disengaging support of the user.

SUMMARY

Various arrangements are described for acquiring network configuration data. A system for acquiring network configuration data may be presented. The system may include a television receiver. The television receiver may include a tuner configured to receive broadcasts of television programming via a television programming broadcast network. The television receiver may include a network interface configured to communicate with the television programming broadcast network configuration server via a network separate from the television programming broadcast network. The television receiver may include one or more processors. The television receiver may include a memory communicatively coupled with and readable by the one or more processors and having stored therein processor-readable instructions. The instructions, when executed by the one or more processors, may cause the one or more processors to, in response to a boot of the television receiver, determine if the network interface can communicate with the television programming broadcast network configuration server. The instructions may cause the one or more processors to, in response to determining the network interface can communicate with the television programming broadcast network configuration server perform the following steps: The instructions may cause the one or more processors to request network configuration data from the television programming broadcast network configuration server via the network interface. The instructions may cause the one or more processors to receive the network configuration data from the television programming broadcast network configuration server via the network interface. The instructions may cause the one or more processors to, based on the network configuration data, process television programming data received via the tuner from the television programming broadcast network.

Embodiments of such a system may include one or more of the following: The system may include a television service provider configuration server, configured to receive a request for the network configuration data from the television receiver via the network. The configuration server may also be configured to, in response to the request, transmit the network configuration data to the television receiver via the network. The television programming broadcast network configuration server may be further configured to select the network configuration data from a plurality of preconfigured network configuration datasets based on information received as part of the request from the television receiver. The information received as part of the request from the television receiver may include an indication of a subscription package linked with the television receiver. The instructions may cause the one or more processors to in response to determining the network interface cannot communicate with the television programming broadcast network configuration server, acquire the network configuration data via the tuner. The network configuration data may include a network information table (NIT) and service description table (SDT). The television programming broadcast network configuration server may be further configured to receive electronic programming guide (EPG) data, format the EPG data to create a formatted EPG table, and, after the network configuration data is transferred to the television receiver, cause the formatted EPG table to be transmitted to the television receiver via the network. The instructions may cause the one or more processors to receive the formatted EPG table. The instructions may cause the one or more processors to store the formatted EPG table. The instructions may cause the one or more processors to output an EPG for display to a presentation device based on the formatted EPG table. The television programming broadcast network may be unidirectional to the tuner of the television receiver via satellite.

In some embodiments, a method for acquiring network configuration data is presented. The method may include in response to a boot of a television receiver, determining if a network interface of the television receiver can communicate with a television programming broadcast network configuration server via a network. The method may include, in response to determining the network interface can communicate with the television programming broadcast network configuration server performing the following steps: The method may include requesting, by the television receiver, network configuration data from the television programming broadcast network configuration server via the network interface and the network. The method may include receiving, by the television receiver, the network configuration data from the television programming broadcast network configuration server via the network interface. The method may include, based on the network configuration data, processing, by the television receiver, television programming data received via a tuner from a television programming broadcast network.

Embodiments of such a method may include one or more of the following: The method may include receiving, by the television programming broadcast network configuration server, a request for the network configuration data from the television receiver via the network. The method may include, in response to the request, transmitting the network configuration data to the television receiver via the network. The method may include selecting, by the television programming broadcast network configuration server, the network configuration data from a plurality of preconfigured network configuration datasets based on information received as part of the request from the television receiver. The information received as part of the request from the television receiver may include an indication of a subscription package linked with the television receiver. The method may include, in response to determining the network interface cannot communicate with the television programming broadcast network configuration server, acquiring, by the television receiver, the network configuration data via the tuner. The network configuration data may include a network information table (NIT) and service description table (SDT). The method may include receiving electronic programming guide (EPG) data. The method may include formatting the EPG data to create a formatted EPG table. The method may include, after the network configuration data is transferred to the television receiver, causing, by the television programming broadcast network configuration server, the formatted EPG table to be transmitted to the television receiver via the network. The method may include receiving, by the television receiver, the formatted EPG table. The method may include storing, by the television receiver, the formatted EPG table. The method may include outputting, by the television receiver, an EPG for display to a presentation device based on the formatted EPG table. The television programming broadcast network may be unidirectional to the tuner of the television receiver via satellite.

In some embodiments, a non-transitory processor-readable medium for acquiring network configuration data is presented. The instructions may be configured to cause one or more processors to, in response to a boot of a television receiver, determine if a network interface can communicate with a television programming broadcast network configuration server. The instructions may be configured to cause one or more processors to in response to determining the network interface can communicate with the television programming broadcast network configuration server perform the following steps: The instructions may be configured to cause one or more processors to request network configuration data from the television programming broadcast network configuration server via the network interface. The instructions may be configured to cause one or more processors to receive the network configuration data from the television programming broadcast network configuration server via the network interface. The instructions may be configured to cause one or more processors to, based on the network configuration data, process television programming data received via a tuner from a television programming broadcast network. In some embodiments, the network configuration data comprises a network information table (NIT) and service description table (SDT).

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Locations at which television receivers are installed may have network connections, such as to the Internet. As such, by connecting the television receivers with the networks, the television receivers may have the ability to perform bidirectional communication with a server system of a television service provider. Rather than having to receive network configuration data on a predefined defined schedule (such as by receiving network configuration data being periodically broadcast to television receivers via satellite), the television receiver may be able to request the network configuration data be transmitted via the network to the television receiver. Such a transmission may allow for the network configuration data to be acquired more quickly than if the television receiver is required to wait for a periodic broadcast of the network configuration data.

In some embodiments, the network configuration data may be customized for the television receiver. For instance, a television service provider may configure a server to distribute varying network configuration data based on the requesting television receiver. For instance, the network configuration data provided to the television receiver may vary based on: the subscription package that a user has selected, the geographic region where the television receiver was installed, the make and/or model of the television receiver, and/or other factors. The television receiver may provide an identifier or other information that is used by the television service provider to select a set of predefined network configuration data to be transmitted to the television receiver via the network rather than via the television programming broadcast network (e.g., via a service provider's proprietary satellite-based network or cable-based network).

In addition to providing network configuration data to the television receiver, additional or alternate data may be provided to a television receiver. For instance, a firmware or software update may be provided to the television receiver via an Internet connection rather than via the television programming broadcast network. Similarly, electronic programming guide (EPG) data may be transmitted to the television receiver via the network rather than having to use the television service provider's proprietary network (e.g., cable or satellite based). Such EPG information may be formatted such that the amount of processing required by the television receiver is reduced. For instance, the EPG information may be transmitted in the form of a table to the television receiver via the network, such that it can be stored and loaded for presentation via a display device.

Figure 1:
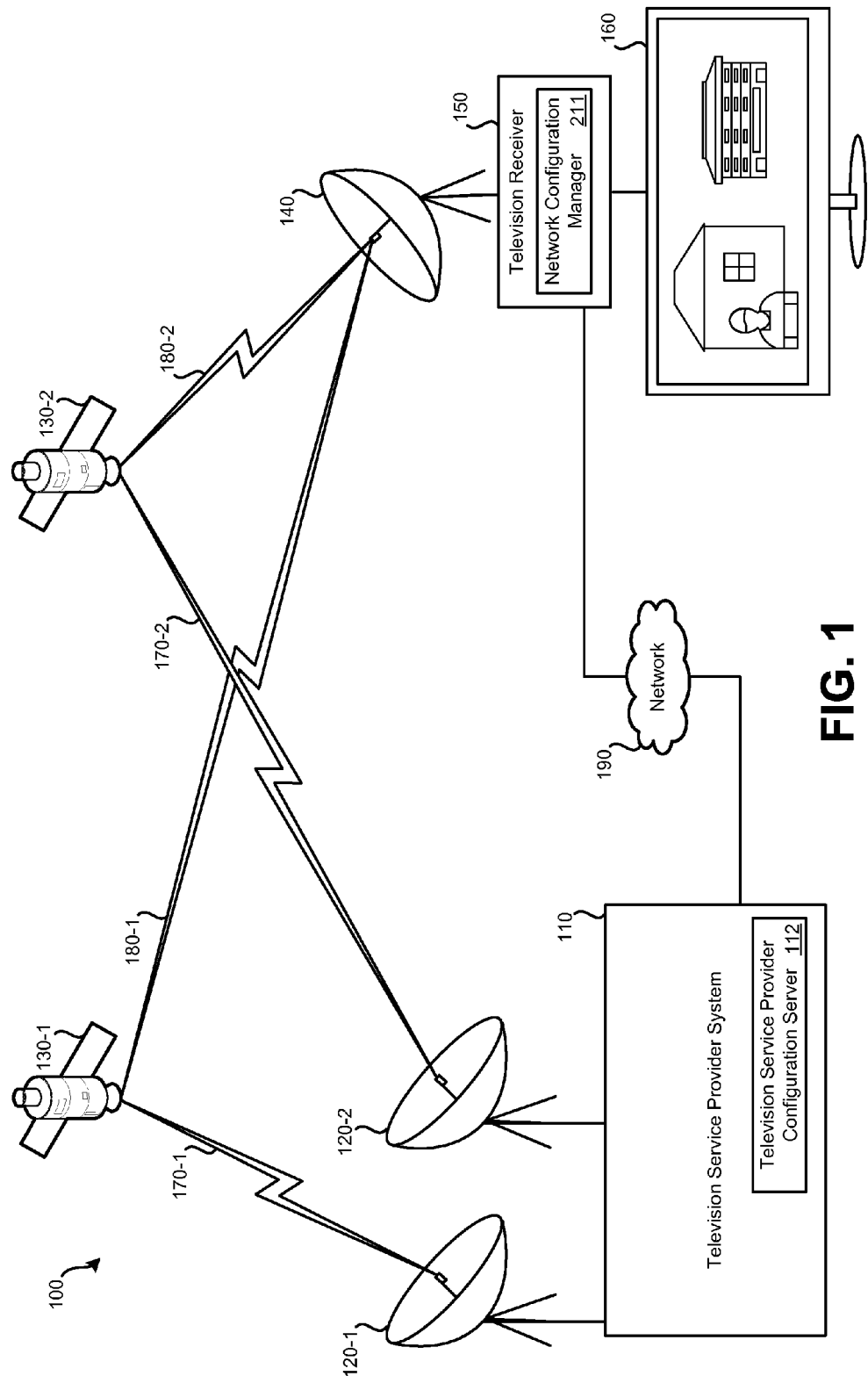
FIG. 1 illustrates an embodiment of a satellite-based television service provider system.

FIG. 1 illustrates an embodiment of a satellite television distribution system 100. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances of user equipment may receive television signals from television service provider system 110 via satellites 130.

Television service provider system 110 and satellite transmitter equipment 120 may be operated by a television service provider. A television service provider may distribute television channels, on-demand programming, programming information, and/or other content/services to users. Network configuration data may also be broadcast to user equipment for use in configuring television receivers. Television service provider system 110 may receive feeds of one or more television channels from various sources. Such television channels may include multiple television channels that contain at least some of the same content (e.g., network affiliates). To distribute television channels for presentation to users, feeds of the television channels and network configuration data may be relayed to user equipment via multiple television distribution satellites which function as a television programming broadcast network. Each satellite may relay multiple transponder streams. In some embodiments, each transponder stream transmits network configuration data; therefore, whichever transponder stream a television receiver is receiving, the necessary network configuration data can be received and used to configure the television receiver. Satellite transmitter equipment 120 (120-1, 120-2) may be used to transmit a feed of one or more television channels and network configuration data from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Network configuration data is defined as data that is necessary to configure a television receiver to receive, store, and/or output for presentation television programming, including broadcasts of television channels, on-demand content, and other data (e.g., EPG data). Network configuration data may be transmitted on one, more than one, or possibly all transponder streams to television receivers. The network configuration data may be repeatedly transmitted on the transponder streams. For instance, as soon as all of the network configuration data has been transmitted on a transponder stream, the network configuration data may begin again being transmitted. As such, the network configuration data may be continuously spooled such that it is always available for reception by television receivers. When being transmitted continuously via satellite, it may be desirable to limit the amount of bandwidth consumed by the network configuration data. As such, for a television receiver to receive all of the network configuration data, a significant amount of time may be required.

Satellites 130 may be configured to receive signals, such as streams of television channels and network configuration data, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel and network configuration data may be relayed via a first transponder of satellite 130-1. A third, fourth, and fifth television channel, and network configuration data may be relayed via a different satellite or a different transponder of the same satellite relaying a transponder stream at a different frequency. A transponder stream transmitted by a particular transponder of a particular satellite may include a finite number of television channels, such as seven. Each transponder stream may be able to carry a finite amount of data. As such, the number of television channels and the rate at which network configuration data is transmitted as part of a particular transponder stream may be constrained. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to receive a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
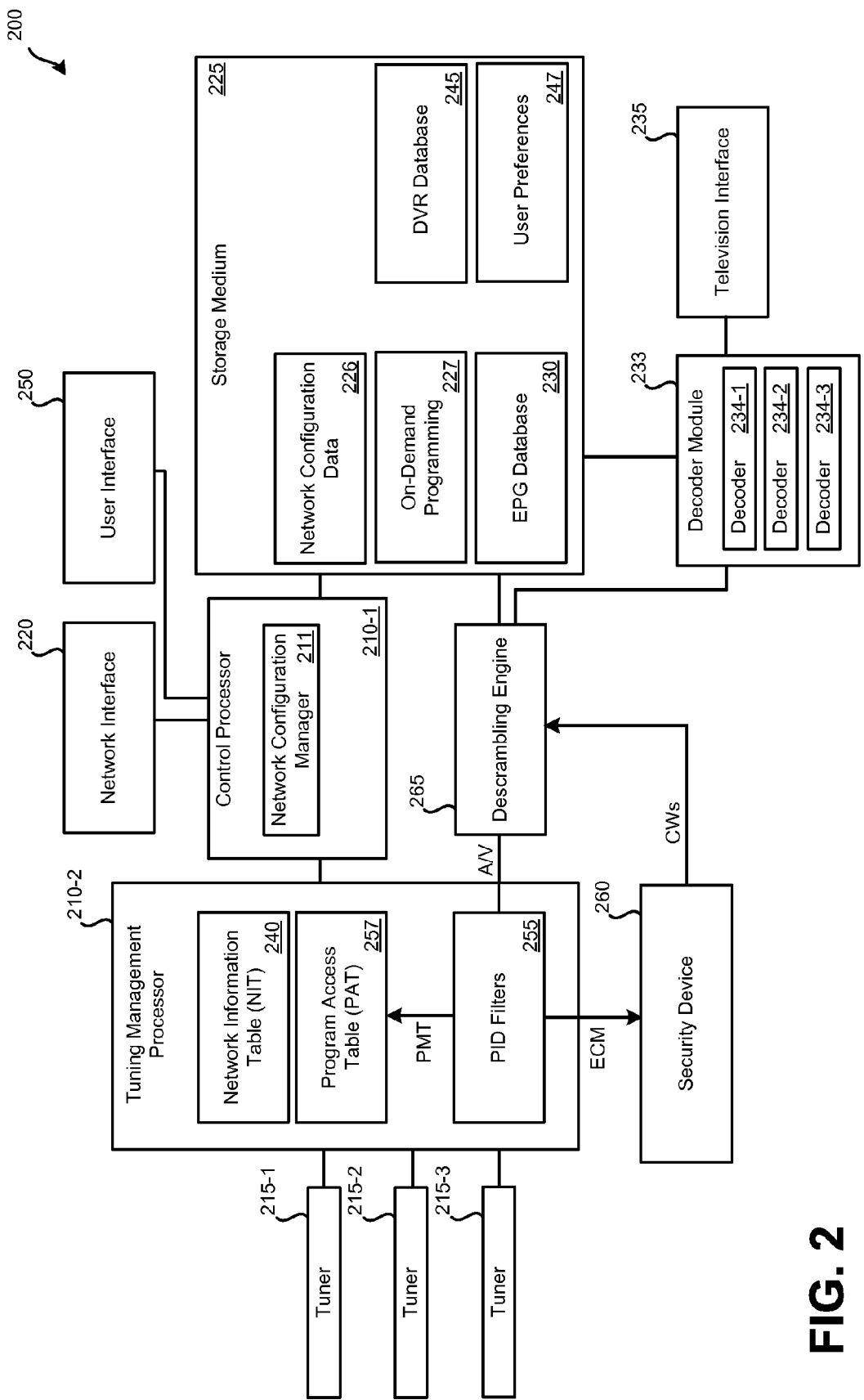
FIG. 2 illustrates an embodiment of a television receiver configured to acquire network configuration data via multiple communication paths from a television service provider.

In communication with satellite dish 140 may be one or more television receivers. Television receivers may be configured to decode signals received from satellites 130 via satellite dish 140 for output and presentation via a display device, such as display device 160. In order to be able to properly decode signals for output as television programming, the television receiver may first be required to receive network configuration data for use in configuring the television receiver. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include a network configuration manager 211 that configures television receiver 150 in accordance with receiver network configuration data. Network configuration manager 211 is described in detail in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels and network configuration data. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled, and network configuration data. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality, then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a communication channel between television service provider system 110 and television receiver 150. Via such a communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130 (the television programming broadcast network), data between television receiver 150 and television service provider system 110 may be transmitted via network 190. For instance, rather than receiving network configuration data via satellites 130, television receiver 150 may receive network configuration data via network 190. Television service provider system 110 may include a television service provider configuration server 112, which is detailed in relation to FIG. 3.

The above description has focused on how network configuration data may be broadcast repeatedly via satellite to television receivers. It should be understood that a similar arrangement may be used in cable-based television programming broadcast networks to broadcast network configuration. For either type of network, it may be possible to transmit other forms of data via an Internet-based network connection rather than using the television service provider's proprietary network. For instance, EPG data may be transmitted to television receivers via a network (e.g., Internet) connection. As another example, firmware and/or software updates may be transmitted on demand to a television receiver via the Internet rather than the television receiver receiving the update via the television programming broadcast network.

FIG. 2 illustrates an embodiment of television receiver 200. Television receiver 200 may be configured to acquire network configuration data via multiple communication paths from a television service provider. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 200 may represent television receiver 150 of FIG. 1 and may be in the form of an STB that outputs video and/or audio to a display device, such as a television. Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), on-demand programming 227, user preferences 247, user interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may include network configuration manager 211. Network configuration manager 211 may be configured to acquire and apply network configuration data to television receiver 200. Network configuration manager 211 may be triggered upon a boot by the television receiver to determine whether new network configuration data is necessary to be obtained. Upon a boot, network configuration manager 211 may be configured to determine whether previously stored network configuration data is stale. Such a determination may be based on whether a predefined period of time has elapsed since the stored network configuration data was obtained and stored. For instance, if 8 hours has elapsed, the stored network configuration data may be ignored (and, possibly, discarded) due to it being stale. If the stored network configuration data is not stale, it may be used to configure the television receiver for operation. If the stored network configuration data is stale, new network configuration data may be required to be obtained before the television receiver can properly receive and output television programming.

Network configuration manager 211 may be configured to assess whether a network (e.g., Internet) connection with a television service provider configuration server (e.g., television service provider configuration server 112) can be obtained using network interface 220. If so, this network connection may be used for requesting and obtaining network configuration data. Network configuration manager 211 may provide data (e.g., an identifier) to the television service provider configuration server that is used to provide a set of network configuration data specific to the television receiver, such as based on the associated subscription, the make and/or model of the television receiver, and/or the geographic location where the television receiver is located.

If network configuration manager 211 cannot connect via network interface 220, the network configuration data may be received via one or more tuners of tuners 215. Whether received via network interface 220 or one or more of tuners 215, network configuration manager 211 may construct tables (e.g., network information table 240) and/or otherwise configure television receiver 200 such that it can receive and output television programming. Network configuration manager may also be configured to coordinate retrieval of EPG data for EPG database 230 and software and/or firmware updates for television receiver 200.

Tuners 215 may include one or more tuners used to tune to (satellite) transponders that include broadcasts of one or more television channels and, possibly, network configuration data. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel, such as the Internet, with a television service provider, if such communication channel is available. The primary communication channel may be via satellite (which may be unidirectional to television receiver 200, and is referred to as the television programming broadcast network) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent one or more non-transitory computer-readable storage mediums. Storage medium 225 may include memory and/or a hard drive. Storage medium 225 may be used to store information received from one or more satellites and/or information received via network interface 220. For instance, storage medium 225 may be used to store network configuration data 226. Storage medium 225 may store information related to EPG database 230, other non-video/audio data 231, DVR database 245, user preferences 247, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously. In some embodiments, EPG data received via satellite may be required to be processed and reformatted by control processor 210-1 for use as part of EPG database 230. If a network connection via network interface 220 is available with the television service provider, EPG data that is already formatted, such as a complete EPG table for use as EPG database 230, may be transmitted to television receiver 200 by the television service provider via the network connection. As such, less or no formatting and/or other processing may need to be performed on the EPG data received via network interface 220.

The network information table (NIT) 240 may store information used by television receiver 200 to access various television channels. NIT 240 may be stored locally by a processor, such as tuning management processor 210-2 and/or by storage medium 225. Information used to populate NIT 240 may be received as part of the network configuration data. As such, information present in NIT 240 may be periodically updated. In some embodiments, NIT 240 may be locally stored by television receiver 200 using storage medium 225 as part of network configuration data 226. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT (which is not illustrated in FIG. 2) is indicated in a separate table, program association table (PAT) 257. Data to populate the PAT may also be included in the network configuration data. A PAT may be stored by the television receiver in a similar manner to the NIT. A PMT may be transmitted for a particular transponder stream, and may store information on audio PIDs, video PIDs, and/or PIDs for other data types. A PMT stores data on ECM (entitlement control message) PIDs for television channels that are transmitted on a transponder frequency.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

User preferences 247 may include stored user preferences. For example, a user may specify a preferred category of television programming, such as: sports, news, movies, sitcoms, reality, etc., and/or specific favorite channels. In some embodiments, data for a user's profile may be defined based on measured viewing habits, such as which television channels and/or categories of television programming does the user watch. User preferences 247 may specify timers set by the user to record future television programming User preferences 247 may include profiles for multiple users or may include a single profile for the television receiver in general. In some embodiments, a user is permitted to select which user profile stored as part of user preferences 247 is active. For instance, a user can log on to television receiver 200. User preferences 247 may be stored by storage medium 225, may be backed up to a separate device (e.g., a remote control) via user interface 250, and/or may be stored remotely, such as by the television service provider and may be retrieved/accessed via network interface 220.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200. A decoder may be able to only decode a single high definition television program at a time. However, a decoder may be able to decode multiple preview clips at the same time. Therefore, if nine preview clips are being presented as tiles in a CVM simultaneously, only one or two decoders of decoders 234 may be necessary to decode the encoded preview clips.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation. Television interface 235 may also serve to output a CVM.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels (e.g., the four major television networks) are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network or via network interface 220. For example, referring to satellite television distribution system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

On-demand programming 227 may represent additional television programming stored by storage medium 225. On-demand programming 227 may include television programming that was not recorded to storage medium 225 via a timer (either user-or provider-defined). Rather, on-demand programming is programming provided to the television receiver directly for storage by the television receiver and for later presentation to one or more users. On-demand programming may not be user-selected. As such, the television programming stored to on-demand programming storage 227 may be the same for each television receiver of a television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1. In some embodiments, it may be possible to load some or all preferences to a remote control. As such, the remote control can serve as a backup storage device for the preferences.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PAT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card or the like.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created to obtain PMT data. The created PID filter may be able to identify PMT packets because an indication is present in NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recording, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PAT 257 or a PMT). A PID filter may be created to obtain network configuration data from a received transponder stream. Similarly, PID filters may be used to obtain EPG data, and/or software/firmware update data. For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or security device 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 700 of FIG. 7.

While the television receiver 200 has been illustrated as a satellite receiver, it is to be appreciated that techniques below may be implemented in other types of television receiving devices, such a cable receivers, terrestrial receivers, or the like. In some embodiments, the television receiver 200 may be configured as a hybrid receiving device, capable of receiving content from disparate communication networks, such as satellite and terrestrial television broadcasts.

Figure 3:
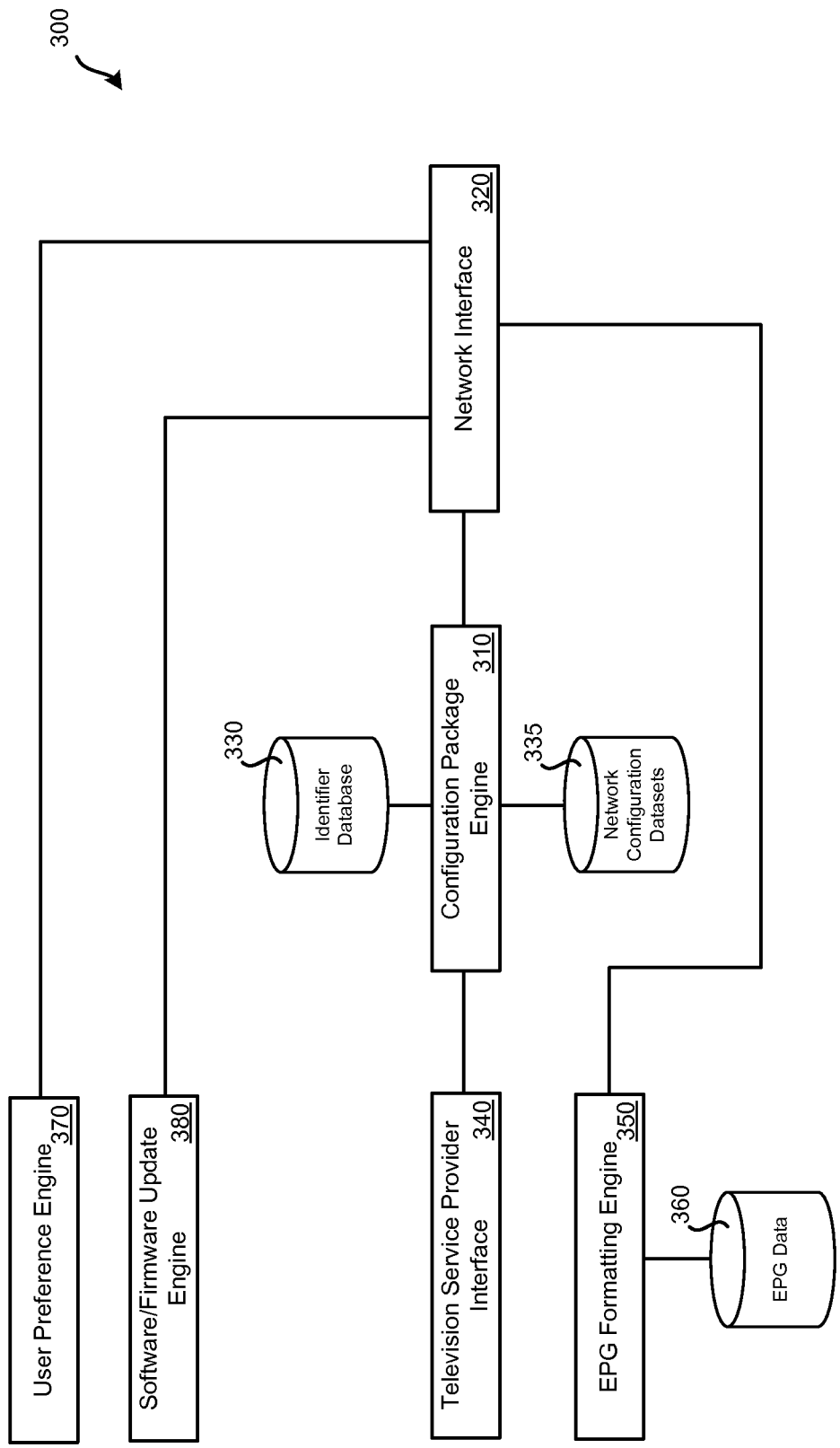
FIG. 3 illustrates an embodiment of a television service provider configuration server.

FIG. 3 illustrates an embodiment of a television service provider configuration server 300. For example, television service provider configuration server 300 may represent television service provider configuration server 112 of FIG. 1. Television service provider configuration server 300 may include one or more computer systems, which may be distributed (e.g., across a network). Television service provider configuration server 300 may have one or more instances of components detailed in relation to computer system 700 of FIG. 7. Television service provider configuration server 300 may be described as having various components that can be implemented using computerized hardware, firmware, and/or software. Television service provider configuration server 300 may include: configuration package engine 310, network interface 320, identifier database 330, network configuration datasets 335, television service provider interface 340, EPG formatting engine 350, EPG tables 360, user preference engine 370 and software/firmware update engine 380.

Configuration package engine 310 may be configured to communicate with television receivers via network interface 320. Network interface 320 may be connected with a network (e.g., network 190 of FIG. 1) which may be the Internet. Network interface 320 may receive requests for data from various television receivers. Such requests may indicate that network configuration data is requested. Additional or alternate information that may be requested is an EPG table or EPG table update, user preferences, and/or a software/firmware upgrade. Network interface 320 may route requests to the appropriate component of television service provider configuration server 300.

Upon receiving a request, configuration package engine 310 may transmit network configuration data to the television receiver via network interface 320. In some embodiments, the network configuration data transmitted in response to all requests is the same. In other embodiments, the network configuration data transmitted in response to the request varies based on one or more properties of the request. In some embodiments, the request may contain an identifier that identifies the requesting television receiver and/or the user's account associated with the television receiver. This identifier may be used by configuration package engine 310 to perform a lookup in identifier database 330. Based on this lookup, the configuration package engine 310 may be able to determine which set of network configuration data from a group of multiple network configuration datasets stored by network configuration datasets 335 should be transmitted in response to the request. The identifier received as part of the request may represent a serial number or other unique identifier of the television receiver or users account. In addition to selecting the network configuration dataset based on an identifier, information that may be used may include: the geographic location of the television receiver, an indication received of the subscription package associated with the television receiver, and/or the make and/or model of the television receiver from which the request was received. In some embodiments, this information is linked with the identifier via identifier database 330.

Network configuration datasets 335, as previously described, may include multiple configuration datasets. These network configuration datasets may be prepared for distribution to various television receivers ahead of receiving requests via network interface 320. In some embodiments, the configuration datasets may be compressed to decrease the amount of time required to transmit to the television receiver via the network. Further, by having different configuration datasets, data that is inapplicable to a particular television receivers may be omitted from the network configuration dataset transmitted to the television receiver.

Specifically, network configuration data for a television receiver may include the following information: the network configuration data may include a network information table (NIT). An NIT may store information about a service provider network, such as a satellite-based service provider network. Information that may be present in an NIT may include: television channel numbers, satellite identifiers (which may be used to ensure different satellites are tuned to for reception of timing signals), frequency identifiers and/or transponder identifiers for various television channels. In some embodiments, an NIT may contain additional data or additional tables that may be stored by the television receiver. The NIT may be standard for all television receivers associated with the television programming broadcast network. Network configuration data may also include a service description table (SDT). An SDT may be transmitted on all transponders of the satellite-based service provider network and may contain the following information: a transport stream identifier, a service identifier, an indication of whether or not program schedules are included in the transport stream, an indication of whether or not information about current and/or upcoming programs is included in the transport stream, an operation status of the service (e.g., starting soon, running, paused, off-the-air), and an indication of whether or not the service is scrambled. The SDT may be standard for all television receivers associated with the television programming broadcast network.

Network configuration data may include an event information table (EIT). The EIT provides information, which may be in chronological order, regarding events within a service, such as program titles and other EPG data (e.g., scheduled time period, scheduled channel). Multiple EITs may be used. For instance, an EIT may provide present/following (P/F) programming information (that is, information on television programs currently being broadcast on television channels and scheduled to be broadcast next on each channel) for various television channels, another EIT may provide two day programming information (programming information on television channels to be broadcast over the next two days), and another EIT may provide 9 day programming information (or some other number of days). The P/F programming information may be on all transponder streams (also referred to as transport streams), the 2 day EIT may be on one transponder (possibly per satellite) and the 9 day EIT may be on a single transponder available to a television receiver.

EITs may be further broken down according to whether the data within an EIT is for television channels of the transport stream (transponder stream) currently tuned to or for other transport streams and as to whether the contained data is information about programming or programming schedule information. For instance, four separate table identifiers may be used for EITs that indicate: present/following event information for the currently tuned to transport stream; present/following event information for other transport streams; event schedule information for the currently tuned to transport stream; and event schedule information for other transport streams.

The EIT may be standard for all television receivers associated with the television programming broadcast network. Additionally, network configuration data may include a conditional access table (CAT). The conditional access table may be related to the decryption/descrambling if various streams of television programming are permitted, using the security device of the television receiver. The CAT may be standard for all television receivers associated with the television programming broadcast network.

Television service provider interface 340 may allow a television service provider to interact with configuration package engine 310. For instance, when an updated table, such as an updated NIT, SDT, EIT, and/or CAT, has been created and is being distributed via the television programming broadcast network, these updated tables may also be provided to configuration package engine 310. Configuration package engine 310 may then create new, updated network configuration datasets that are stored in network configuration datasets 335. These new network configuration datasets 335 may then be available upon request for transmission via network to television receivers. Therefore, the network configuration data transmitted via the television programming broadcast network to the television receivers may match the network configuration data present in network configuration datasets 335.

In addition to network configuration data, other data may be transmitted to television receivers by television service provider configuration server 300. For example, EPG formatting engine 350 may be used to transmit a formatted EPG table or database to television receivers via network interface 320. Various television receivers may require EPG data be formatted for storage in different formats. EPG formatting engine 350 may create preformatted EPG tables which require no or less formatting to be performed by the receiving television receiver. Such preformatted EPG tables may be configured for use based on the architecture of the television receiver from which the request was received. As such, the amount of computation required to be performed on the received formatted EPG table may be significantly decreased from the amount of processing necessary to be performed on EPG data received via the television programming broadcast network. In some embodiments, EPG information is sent following network configuration data. While network configuration data may be necessary for a television receiver to begin storing and/or outputting television programming, EPG information may be used for setting and executing timers, and for alerting users as to when a particular television program is scheduled to be aired.

In addition to EPG information and network configuration data, user preferences may also be transmitted to a television receiver upon request via network interface 320 by user preference engine 370. User preference engine 370 may have access to a database configured to store received user preferences on a user-by-user basis. As such, user preferences associated with the particular user or particular television receiver may be stored and retrieved by user preference engine 370. Additionally or alternatively, software and/or firmware updates may be transmitted to a television receiver on request via network interface 320 by software/firmware update engine 380. The software/firmware update engine 380 may have access to a database of multiple versions of software and/or firmware updates. Such updates may be provided to television receivers based on the make and/or model of the television receiver.

Figure 4:
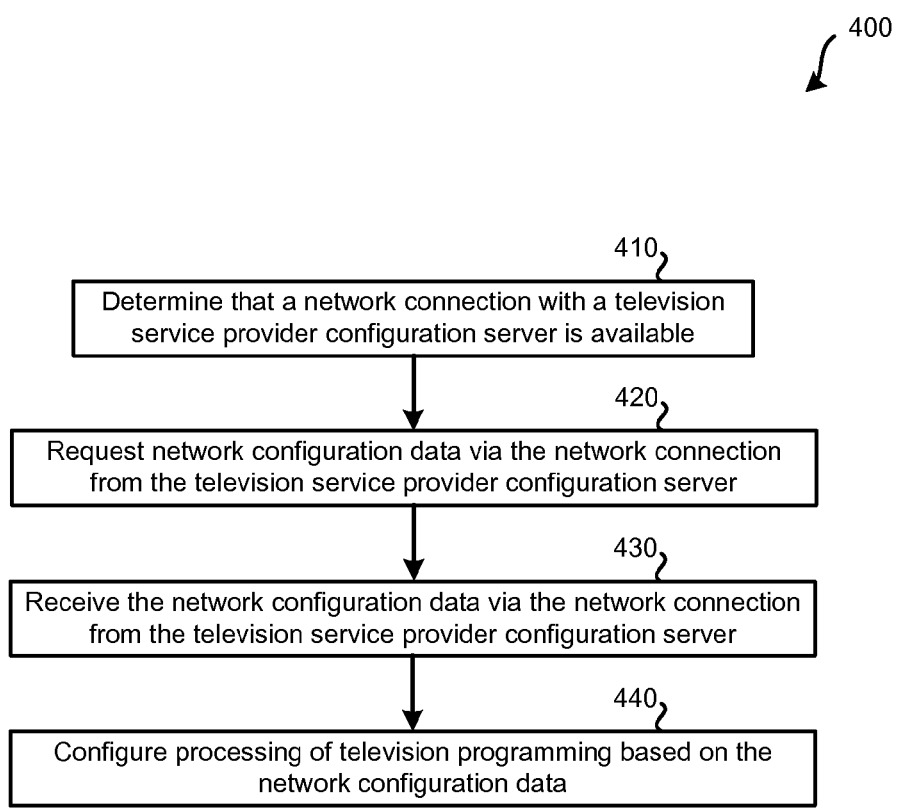
FIG. 4 illustrates an embodiment of a method for acquiring network configuration data by a television receiver.

Various methods may be performed using the systems detailed in relation to FIGS. 1-3. FIG. 4 illustrates an embodiment of a method 400 for acquiring network configuration data by a television receiver. Method 400 may be performed by a television receiver in communication with a television service provider configuration server via the Internet. The television receiver of method 400 may represent television receiver 200 of FIG. 2. The television receiver may be configured to receive broadcast television programming and, possibly, network configuration data via satellite. Each step of method 400 may be performed by such a television receiver. The television receiver that performs method 400 may include various computerized components as detailed in relation to FIG. 7.

At step 410, it may be determined that a network connection between the television receiver and a television service provider configuration server is available. Based on this connection being available, rather than obtaining network configuration data via the television programming broadcast network (e.g., via satellite), the network configuration data may be obtained by the television receiver via the network connection, which may involve the Internet. At step 410, due to a network connection being available, network configuration data received via a tuner by the television receiver may be ignored and may not be stored.

At step 420, a request for network configuration data may be transmitted via the network connection to the television service provider configuration server. This request may include an identifier (and/or other identification information) that identifies the television receiver and/or characteristics of the television receiver, such as its make and/or model, the user's subscription package, a username, a password, the geographic region where the television receiver is located, and/or other information which may be used to select particular network configuration data for transmission to the television receiver. The network configuration data requested at step 420 may include data that is necessary for the television receiver to receive television programming, such as via satellite. For instance, for the television receiver to be properly configured to receive television programming via satellite, it may be required to have a stored NIT, SDT, EIT, and CAT (which, in some embodiments, need to be invoked by the television receiver sequentially). Each of these tables may be included in the network configuration data that is requested at step 420.

In response to this request, at step 430, the network configuration data may be received by the television receiver via the network connection. Since a network connection with the Internet is used at step 430, it may be expected that the amount of time to transfer the network configuration data from the television service provider configuration server to the television receiver will be significantly less than if the network configuration data had been received via the television programming broadcast network, which may have little bandwidth allocated to transmission of the network configuration data and may transmit extraneous configuration data not needed by a particular television receiver.

Once the network configuration data has been received, at step 440 the television receiver may be configured in accordance with the network configuration data. By configuring the television receiver using the network configuration data, the television receiver may now be properly configured to receive, store, and/or output for presentation television programming, which may include broadcast programming, on-demand content, and/or other forms of television programming.

Figure 5:
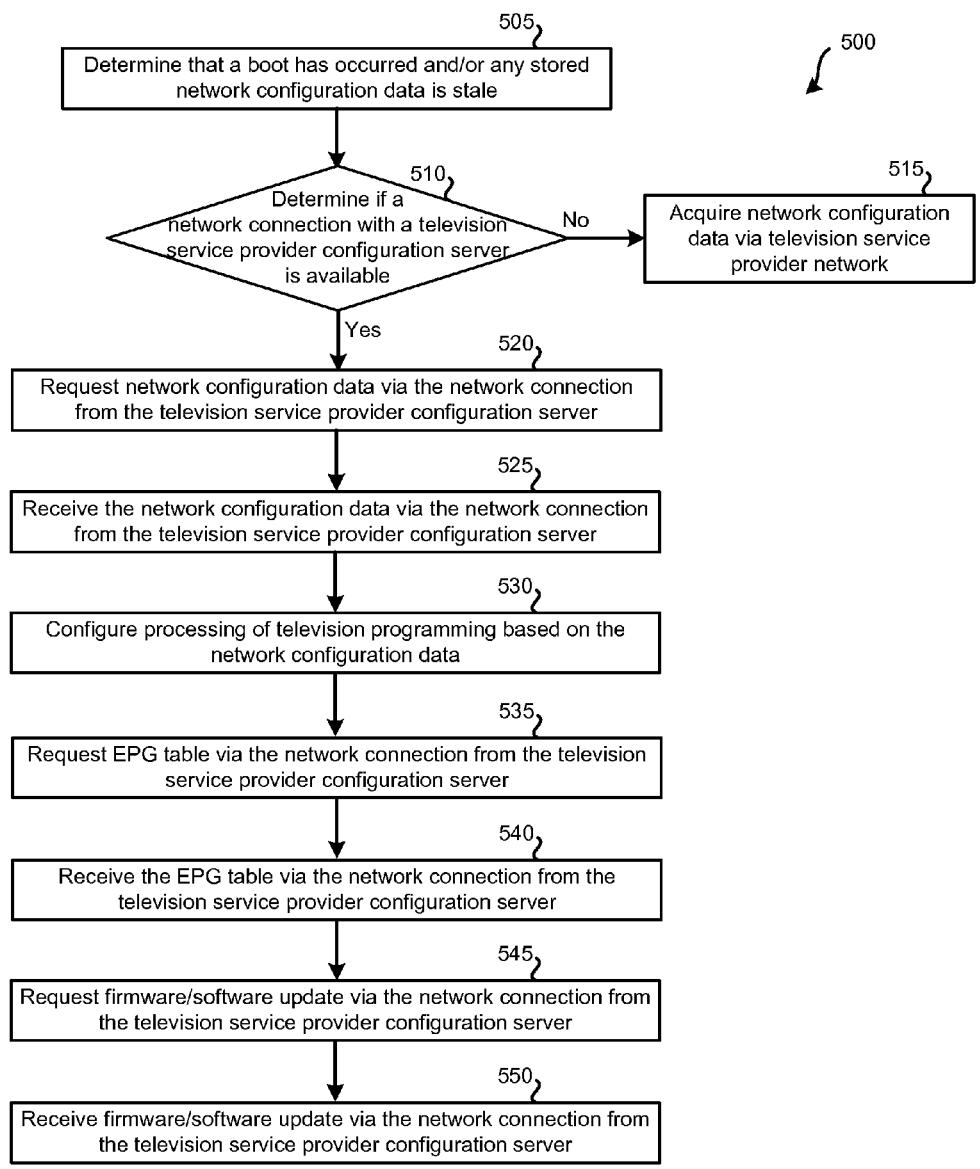
FIG. 5 illustrates an embodiment of acquiring network configuration data, electronic programming guide (EPG) data, and user preference data by a television receiver.

FIG. 5 illustrates an embodiment of acquiring network configuration data, electronic programming guide (EPG) data, and user preference data by a television receiver. Method 500 may be performed by a television receiver in communication with a television service provider configuration server. The television receiver of method 500 may be television receiver 200 of FIG. 2. The television receiver may be configured to receive broadcast television programming and, possibly, network configuration data via satellite. Each step of method 500 may be performed by such a television receiver. The television receiver that performs method 500 may include various computerized components as detailed in relation to FIG. 7.

At step 505, the television receiver may determine whether it has booted. A boot may occur when a television receiver is powered on from a powered down state or a reset is performed. At step 505, it also may be determined whether previously-stored network configuration data is available. For instance, while the television receiver was previously powered on, network configuration data may have been stored to a local storage medium, such as a storage medium 225 of FIG. 2. Associated with the stored network configuration data, a timestamp may be stored. If the network configuration data is less than a predefined period of time old, the television receiver may be configured for operation using the stored network configuration data. Use of the stored network configuration data may eliminate the need to immediately acquire a new network configuration dataset. However, if the network configuration data is stale, that is, older than the predefined period of time, new network configuration data may be required to be acquired before the television receiver becomes functional to receive, store, and/or output for presentation television programming If at step 505 it is determined that no stored network configuration data is available or the stored network configuration data is stale, method 500 may proceed to step 510. At step 510, the television receiver may determine if a network connection with the television service provider configuration server is available. This network connection may involve the television receiver being connected with the Internet, such as via a subscription with an Internet service provider and a home wireless network. In some embodiments, a local area network cable or some other form of wired connection may be directly connected to the television receiver to permit access to the Internet.

If, at step 510, it is determined that the network connection with the television service provider configuration server is not available, method 500 may proceed to step 515. At step 515, network configuration data may be acquired via the television programming broadcast network. In the instance of a satellite-based television programming broadcast network, a tuner of the television receiver may be used to obtain network configuration data that is broadcast to all television receivers via satellite on one or more transponder streams. In some embodiments, multiple tuners may be used to acquire the network configuration data at step 515 as transmitted via the television programming broadcast network. In some embodiments, on different transponder streams, different portions of the network configuration data may be transmitted. As such, by having a tuner that is tuned to each of these different transponder streams, different portions of the network configuration data may be obtained over a same time period. These different portions may be aggregated to create a complete set of network configuration data. Such an arrangement may result in faster acquisition of the network configuration data via the television programming broadcast network.

If, at step 510, it is determined that the network connection with the television service provider configuration server is available, method 500 may proceed to step 520. If method 500 proceeds to step 520 from step 510, network configuration data may also be stored as it is acquired via the television programming broadcast network (as detailed in step 515). As such, if acquisition of the network configuration data via the network connection fails, acquisition of the network configuration data may already have commenced via the television programming broadcast network and one or more tuners. In some embodiments, it may be possible to combine network configuration data required via the television programming broadcast network with another portion of the network figuration data received via the network connection. Such a form of acquisition may be in some instances faster than using either acquisition method individually.

At step 520, a request for network configuration data may be transmitted via the network connection (e.g., via the Internet) to the television service provider configuration server. This request may include an identifier (and/or other identification information) that identifies the television receiver and/or characteristics of the television receiver, such as its make and/or model, the user's subscription package, a username, a password, the geographic region where the television receivers are located, and/or other information which may be used to select particular network configuration data for transmission to the television receiver. The network configuration data requested at step 520 may include data that is necessary for the television receiver to receive television programming, such as via satellite. For instance, for the television receiver to be properly configured to receive television programming via satellite, it may be required to have access to various tables, which may include: an NIT, an SDT, an EIT, and a CAT. Each of these tables may be included in the network configuration data that is requested at step 520.

In response to this request, at step 525, the network configuration data may be received by the television receiver via the network connection. Since a network connection with the Internet is used at step 525, it may be expected that the amount of time to transfer the network configuration data from the television service provider configuration server to the television receiver will be significantly less than if the network configuration data had been received (possibly exclusively) via the television programming broadcast network. If the transmission of the network configuration data via the network connection to the television receiver for any reason fails during transmission, network configuration data may already have begun to be saved as received by the tuner of the television receiver, or such acquisition of the network configuration data may then commence. Decompression of the transmitted data by the television receiver may be necessary.

Once the network configuration data has been received, at step 530, the television receiver may be configured in accordance with the network configuration data. By configuring the television receiver with the network configuration data, the television receiver may now be properly configured to receive, store, and/or output for presentation television programming, which may include broadcast programming, on-demand content, and/or other forms of television programming.

In addition to network configuration data, other data may be acquired via the network connection as opposed to the television programming broadcast network. After the network configuration data has been acquired by the television receiver and used to configure the television receiver, the television receiver may become operational to receive, store, and/or output for presentation television programming. However, other information may be useful for the user's reference and/or may enhance functionality of the television receiver. For instance, EPG data may be useful for a user's reference and may enable the television receiver to record particular television programs.

At step 535, EPG information may be requested by the television receiver from the television service provider configuration server. In some embodiments, the initial request sent for network configuration data at step 520 may serve as a request for EPG data. In other embodiments, the EPG data may be requested separately, likely after the network configuration data has been successfully transmitted to the television receiver. The EPG data requested may be in the form of a completed EPG table that can be stored and accessed by the television receiver without the television receiver needing to perform additional formatting of the EPG data. EPG data may be transmitted via the television programming broadcast network to the television receiver; however this EPG data may be required to be formatted by the television receiver prior to storage or incorporation into a locally stored EPG database. EPG data obtained via the network connection may be preformatted for the television receiver. For instance, in some embodiments, the EPG database which stores an EPG table may vary by the make and/or model of the television receiver or by the operating environment of the television receiver. These sets of EPG data transmitted to the television receiver may also be selected based on the user's subscription (such that EPG data for only channels available in the user's subscription is provided).

At step 540, a preformatted EPG table or other form of EPG data may be received by the television receiver from the television service provider configuration server via the network connection. It can be expected that the amount of time necessary to receive this EPG information may be significantly less than if the EPG data was received via the television programming broadcast network. For a satellite-based television programming broadcast network, EPG data may be continuously transmitted to permit a complete EPG to be built by a television receiver over a period of time. However, such acquisition may be time-consuming due to a limited amount of satellite bandwidth being allocated to such a transmission. EPG data may become available for use by the television receiver faster when the network connection via the Internet is used to acquire the EPG data. If a preformatted EPG table is received by the television receiver, any previously stored EPG table of the television receiver may be discarded and replaced with the preformatted EPG table. Such an arrangement may significantly decrease the amount of processing required by the television receiver to configure the EPG for use. Decompression of the transmitted data by the television receiver may be necessary. A similar request and fulfillment by the television service provider configuration server may be performed for user preferences that have been stored to the television service provider configuration server.

In addition or in alternate to the EPG data being provided to the television receiver, the television receiver may be able to check for a firmware/software update. In some embodiments, such an update may be performed before network configuration data is obtained. For a satellite-based television programming broadcast network, the current version of the firmware/software may be continuously transmitted to permit acquisition by a television receiver. However, such acquisition may be time consuming due to a limited amount of satellite bandwidth being allocated to such a transmission.

At step 545, a request for the firmware/software update may be transmitted via the network connection to the television service provider configuration server. The request may indicate the current version of the firmware and/or software present on the television receiver. If the version installed matches the version available from the television service provider configuration server, there may be no need for the television service provider to provide firmware or software updates to the television receiver. If an update is to be provided, the firmware and/or software update may be transmitted via the network connection to the television receiver and received at step 550 for subsequent installation. Decompression of the transmitted data by the television receiver may be necessary.

Figure 6:
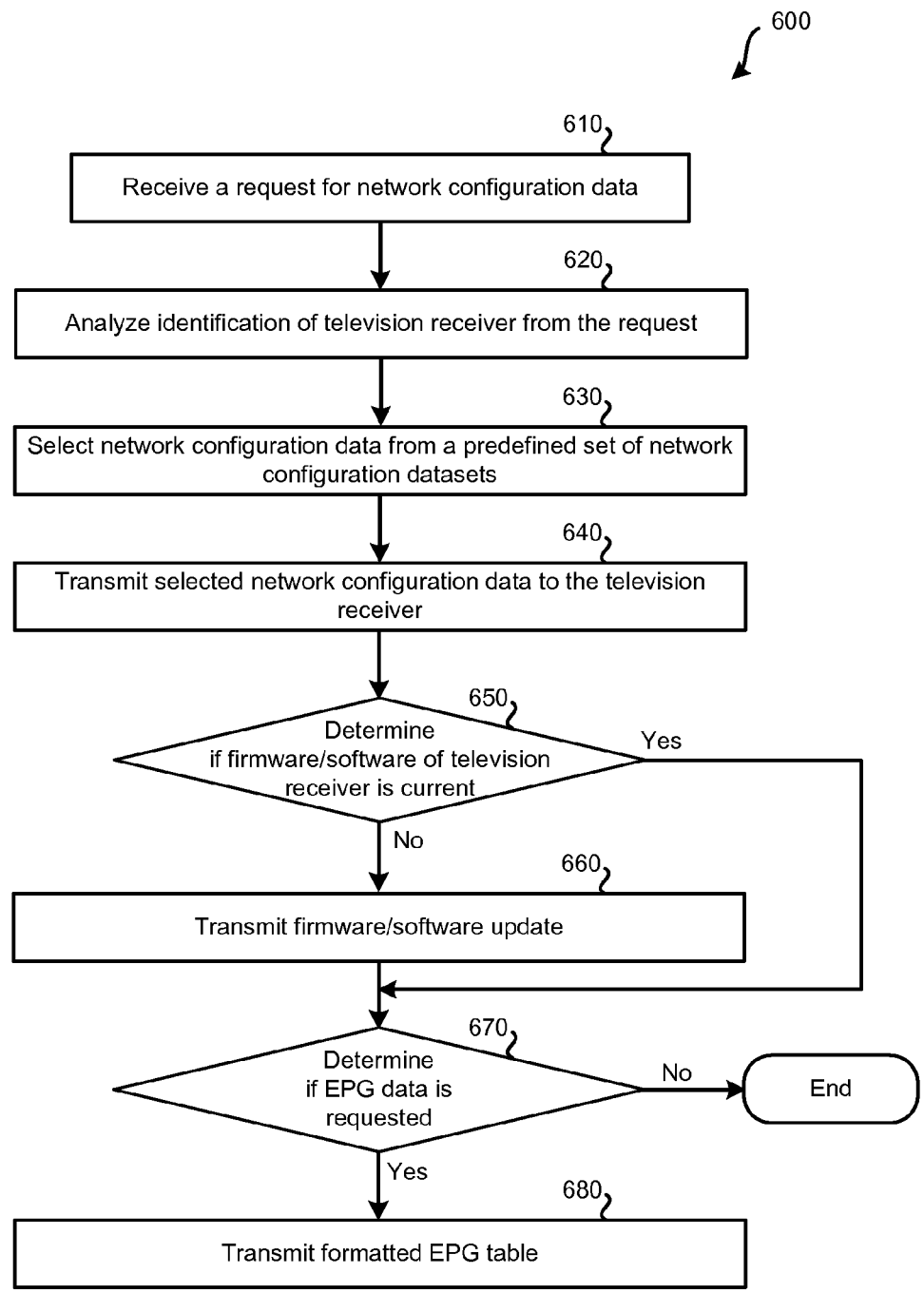
FIG. 6 illustrates an embodiment of a method for providing network configuration data to a television receiver.

FIG. 6 illustrates an embodiment of a method for providing network configuration data to a television receiver. Method 600 may be performed by a television service provider configuration server in communication with one or more television receivers. The television service provider configurations server of method 600 may be television service provider configuration server 300 of FIG. 3. The television service provider configurations server may be configured to communicate via the Internet with a television receiver that receives television programming via a satellite-based television programming broadcast network. Each step of method 600 may be performed by such a television service provider configurations server, which may include one or more computer systems that can be distributed. The television service provider configurations server that performs method 600 may include various computerized components as detailed in relation to FIG. 7. Method 600 may be performed in conjunction with method 400 of FIG. 4, method 500 of FIG. 5, or some other method performed by a television receiver.

A request for network configuration data may be received by the television service provider configurations server at step 610 via a network connection, such as the Internet. This request may have been transmitted by the television receiver as part of step 420 or step 520 of methods 400 and 500, respectively. At step 620, the request, which may include an identifier and/or other identification information may be analyzed by the television service provider configurations server. Such analysis may include looking up the identifier in an identifier database (e.g., identifier database 330 of FIG. 3) to determine a predefined network configuration dataset that should be transmitted to the television receiver. The television service provider configurations server may have previously created the predefined network configuration dataset based on various characteristics of television receivers, including geography, make and/or model, and/or subscription package. The predefine network configuration datasets may be compressed to decrease the transfer time. In some embodiments, the predefined network configuration dataset may create a television receiver-specific dataset upon receiving the request from the television receiver. In other embodiments, the predefined configuration data is standard for all television receivers. At step 630, the network configuration dataset to be transmitted to the television receiver from which the request was received at step 610 is selected. The selected network configuration dataset contains at least some of the data that is also being broadcast to television receivers via the television programming broadcast network as network configuration data.

At step 640, the network configuration dataset is transmitted to the television receiver via the network connection, such as the Internet. It can be expected that the transfer will take less time than a transfer via the television programming broadcast network, due to more bandwidth likely being available via the Internet connection.

After the network configuration data has been transferred, a determination may be made as to whether the firmware and/or software of the television receiver is up-to-date at step 650. Such a firmware/software update process may also be performed before the network configuration data is provided to the television receiver. The firmware/software update check may be initiated based on the television receiver requesting network configuration data or based on a separate request from the television receiver. If the software and/or firmware version of the television receiver is up-to-date, method 600 may proceed to step 670; otherwise a firmware and/or software update may be transmitted to the television receiver at step 660 for installation at the television receiver via the network connection (e.g., the Internet). Software and/or firmware updates may also be broadcast using less bandwidth via the television programming broadcast network, such as via satellite, to multiple television receivers. A similar request and fulfillment by the television service provider configuration server may be performed for user preferences that have been stored to the television service provider configuration server.

After the network configuration data has been transferred, a determination may be made as to whether EPG data should be transmitted to the television receiver. The EPG data transfer may be initiated based on the television receiver having sent a request for the network configuration data at step 610 or based on a separate request from the television receiver. The EPG data transmitted may be a complete EPG table that has been preformatted to a format used by the television receiver, thus decreasing the amount of processing the television receiver needs to perform on the EPG data upon receipt. EPG data may also be broadcast using less bandwidth via the television programming broadcast network, such as via satellite, to multiple television receivers. If EPG data is determined to be requested at step 670, the EPG data may be transmitted via the network connection (e.g., the Internet) to the television receiver at step 680. The EPG data provided to the television receiver may only include EPG information for television channels that the user has access to via his subscription. By omitting other channels, the amount of data to be transmitted to the television receiver may be decreased. Method 600 may end after the EPG data has been transmitted.

Figure 7:
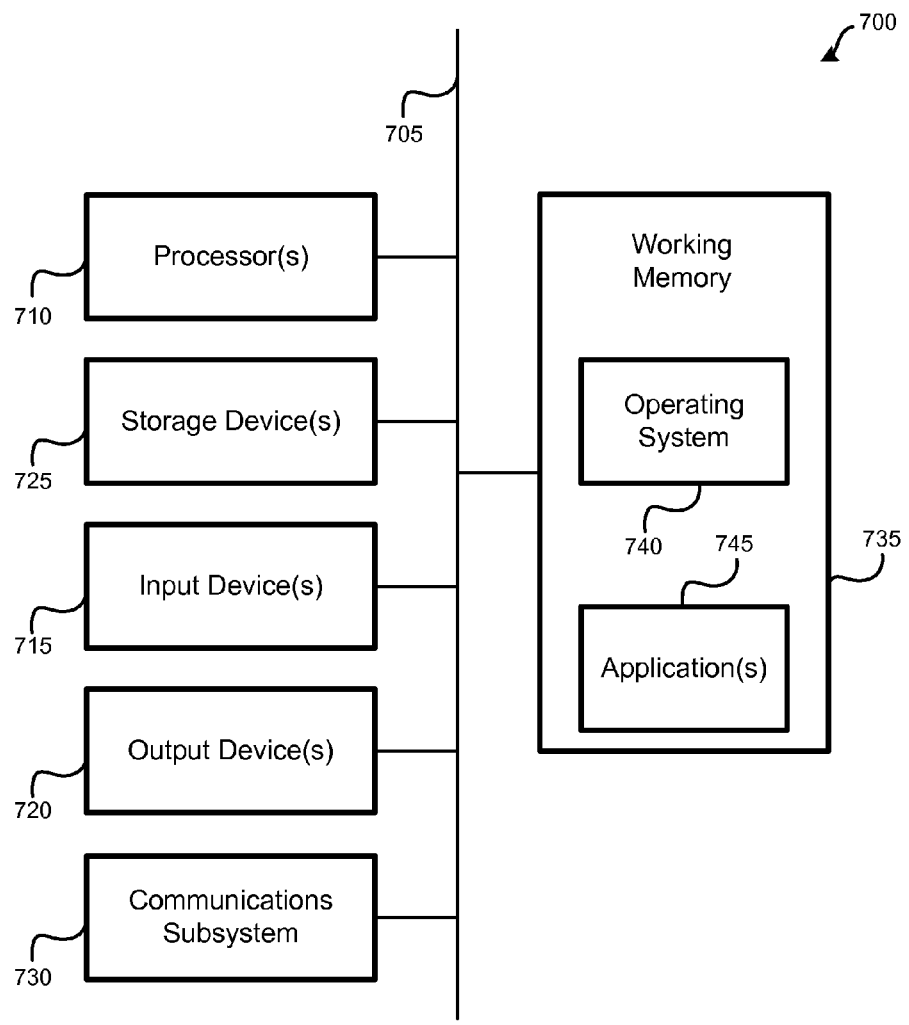
FIG. 7 illustrates an embodiment of a computer system.

FIG. 7 illustrates an embodiment of a computer system. A computer system as illustrated in FIG. 7 may be incorporated as part of the previously described computerized devices, such as the television receivers and/or television service provider configuration server. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for acquiring network configuration data, the system comprising:
   a television service provider system that comprises:
      a television service provider configuration server that communicates with television receivers via a television programming broadcast network and the Internet;
      a network configuration dataset database that stores sets of network configuration data,
      an identifier database that maps television receiver identifiers to network configuration data; and
   a television receiver, comprising:
      a tuner configured to receive broadcasts of television programming via a television programming broadcast network, wherein network configuration data is received by the tuner on a transponder stream from the television programming broadcast network;
      a network interface configured to communicate with the television service provider configuration server via a network separate from the television programming broadcast network, the network comprising the Internet;
      one or more processors; and
      a memory communicatively coupled with and readable by the one or more processors and having stored therein processor-readable instructions which, when executed by the one or more processors, cause the one or more processors to:
         in response to a boot of the television receiver, determine that previous-stored network configuration data is stored by the television receiver;
         compare a timestamp of the previously-stored network configuration data with a current time;
         determine that the previously-stored network configuration data is stale based on comparing the timestamp with the current time;
         in response to determining that the previously-stored network configuration data is stale:
            determine if the network interface can communicate with the television service provider configuration server via the network;
            in response to determining the network interface can communicate with the television service provider configuration server:
               transmit a request for network configuration data via the network interface and the network to the television service provider configuration server, the request comprising an identifier of the television receiver;
               receive the network configuration data from the television service provider configuration server via the network interface, wherein:
                  the television service provider system retrieves a set of network configuration data from the sets of network configuration data stored by the network configuration dataset database selected based on the identifier of the television receiver being looked up in the identifier database to determine the network configuration data is mapped to the identifier; and
                  based on the received set of network configuration data, process television programming data received via the tuner from the television programming broadcast network.

2. The system for acquiring the network configuration data of claim 1, wherein the television service provider configuration server is further configured to:
   receive the request from the television receiver via the network; and in response to the request, transmit the set of network configuration data to the television receiver via the network.

3. The system for acquiring the network configuration data of claim 1, wherein the information received as part of the request from the television receiver comprises an indication of a subscription package linked with the television receiver.

4. The system for acquiring the network configuration data of claim 1, wherein the processor-readable instructions of the television receiver, when executed by the one or more processors, cause the one or more processors to:
in response to determining the network interface cannot communicate with the television service provider configuration server, acquire the network configuration data via the tuner.

5. The system for acquiring the network configuration data of claim 1, wherein the television service provider configuration server is further configured to:
receive electronic programming guide (EPG) data;
format the EPG data to create a formatted EPG table; and
after the set of network configuration data is transferred to the television receiver, cause the formatted EPG table to be transmitted to the television receiver via the network.

6. The system for acquiring the network configuration data of claim 5, wherein the processor-readable instructions of the television receiver, when executed by the one or more processors, cause the one or more processors to:
receive the formatted EPG table;
store the formatted EPG table; and
output an EPG for display to a presentation device based on the formatted EPG table.

7. The system for acquiring network configuration data of claim 1, wherein the television programming broadcast network is unidirectional to the tuner of the television receiver via satellite.

8. A method for acquiring network configuration data, the method comprising:
in response to a boot of a television receiver, determine previous-stored network configuration data is stored by the television receiver;
compare a timestamp of the previously-stored network configuration data with a current time;
determine that the previously-stored network configuration data is stale based on comparing the timestamp with the current time;
in response to determining that the previously-stored network configuration data is stale:
determining if a network interface of the television receiver can communicate with a television programming broadcast network configuration server via a network;
in response to determining the network interface can communicate with the television programming broadcast network configuration server:
transmitting a request, by the television receiver, for network configuration data from the television programming broadcast network configuration server via the network interface and the network, wherein the request comprises an identifier of the television receiver;
retrieving, by the television programming broadcast network configuration server, a set of network configuration data from a plurality of stored sets of network configuration data from a network configuration dataset database based on the identifier of the television receiver;
receiving, by the television receiver, the set of network configuration data from the television programming broadcast network configuration server via the network interface, wherein:
the television programming broadcast network configuration server retrieves a set of network configuration data from the sets of network configuration data stored by a network configuration dataset database selected based on the identifier of the television receiver being looked up in the identifier database to determine the network configuration data is mapped to the identifier; and
network configuration data is also received by one or more tuners of the television receiver on one or more transponder streams from a television programming broadcast system; and
based on the received set of network configuration data, processing, by the television receiver, television programming data received via a tuner from a television programming broadcast network.

9. The method for acquiring the network configuration data of claim 8, the method further comprising:
receiving, by the television programming broadcast network configuration server, the request from the television receiver via the network; and
in response to the request, transmitting the set of network configuration data to the television receiver via the network.

10. The method for acquiring the network configuration data of claim 8, wherein the request comprises an indication of a subscription package linked with the television receiver.

11. The method for acquiring the network configuration data of claim 8, the method further comprising:
in response to determining the network interface cannot communicate with the television programming broadcast network configuration server, acquiring, by the television receiver, the network configuration data via the tuner.

12. The method for acquiring the network configuration data of claim 8, the method further comprising:
receiving electronic programming guide (EPG) data;
formatting the EPG data to create a formatted EPG table; and
after the set of network configuration data is transferred to the television receiver, causing, by the television programming broadcast network configuration server, the formatted EPG table to be transmitted to the television receiver via the network.

13. The method for acquiring the network configuration data of claim 12, the method further comprising:
receiving, by the television receiver, the formatted EPG table;
storing, by the television receiver, the formatted EPG table; and
outputting, by the television receiver, an EPG for display to a presentation device based on the formatted EPG table.

14. The method for acquiring network configuration data of claim 8, wherein the television programming broadcast network is unidirectional to the tuner of the television receiver via satellite.

15. A non-transitory processor-readable medium for acquiring network configuration data, comprising processor-readable instructions configured to cause one or more processors to:
- in response to a boot of a television receiver, determine whether previous-stored network configuration data is stored by the television receiver;
- compare a timestamp of the previously-stored network configuration data with a current time;
- determine that the previously-stored network configuration data is stale based on comparing the timestamp with the current time;
- in response to determining that the previously-stored network configuration data is stale:
  - determine if a network interface can communicate with a television programming broadcast network configuration server;
  - in response to determining the network interface can communicate with the television programming broadcast network configuration server:
    - cause a request for network configuration data from a television service provider configuration server to be transmitted via the network interface, wherein the request comprises an identifier of the television receiver;
- receive the network configuration data from the television programming broadcast network configuration server via the network interface, wherein:
  - network configuration data is also received by the television receiver on one or more transponder streams from a television programming broadcast network via one or more tuners;
  - the television service provider configuration server provides the network configuration data from a stored plurality of sets of network configuration data based on the identifier of the television receiver; and
  - based on the network configuration data, process television programming data received via a tuner from a television programming broadcast network.

* * * * *